United States Patent [19]
Hagan et al.

[11] Patent Number: 5,966,547
[45] Date of Patent: Oct. 12, 1999

[54] SYSTEM FOR FAST POSTING TO SHARED QUEUES IN MULTI-PROCESSOR ENVIRONMENTS UTILIZING INTERRUPT STATE CHECKING

[75] Inventors: Stephen C. Hagan; Keith W. Holt, both of Wichita, Kans.

[73] Assignee: LSI Logic Corporation, Milpitas, Calif.

[21] Appl. No.: 08/781,871

[22] Filed: Jan. 10, 1997

[51] Int. Cl.$^6$ .............................. G06F 13/00; G06F 13/14
[52] U.S. Cl. ...................... 395/877; 395/200.77; 395/500
[58] Field of Search ..................... 395/877, 872, 395/200.77, 500; 364/200; 365/221, 200

[56] References Cited

U.S. PATENT DOCUMENTS

| | | | |
|---|---|---|---|
| 4,038,642 | 7/1977 | Bouknecht et al. | 364/900 |
| 4,429,360 | 1/1984 | Hoffman et al. | 364/200 |
| 4,807,111 | 2/1989 | Cohen et al. | 364/200 |
| 4,821,170 | 4/1989 | Bernick et al. | 364/200 |
| 4,945,548 | 7/1990 | Lannarone | 375/4 |
| 5,003,464 | 3/1991 | Ely et al. | 364/200 |
| 5,023,776 | 6/1991 | Gregor | 364/200 |
| 5,224,215 | 6/1993 | Disbrow | 395/250 |
| 5,239,634 | 8/1993 | Buch et al. | 395/400 |
| 5,274,823 | 12/1993 | Brenner et al. | 395/725 |
| 5,313,587 | 5/1994 | Patel et al. | 395/275 |
| 5,313,638 | 5/1994 | Ogle et al. | 395/725 |
| 5,319,778 | 6/1994 | Catino | 395/600 |
| 5,325,526 | 6/1994 | Cameron et al. | 395/650 |
| 5,341,491 | 8/1994 | Ramanujan | 395/425 |
| 5,363,497 | 11/1994 | Baker et al. | 395/425 |
| 5,381,413 | 1/1995 | Tobagi et al. | 370/85.6 |
| 5,388,215 | 2/1995 | Baker et al. | 395/200 |
| 5,394,547 | 2/1995 | Correnti et al. | 395/650 |
| 5,404,521 | 4/1995 | Murray | 395/650 |
| 5,442,730 | 8/1995 | Bigus | 395/22 |
| 5,519,883 | 5/1996 | White et al. | 395/840 |
| 5,541,912 | 7/1996 | Choudhury et al. | 370/17 |
| 5,546,391 | 8/1996 | Hochschild et al. | 370/60 |
| 5,551,001 | 8/1996 | Cohen et al. | 395/449 |
| 5,555,396 | 9/1996 | Alferness et al. | 395/474 |
| 5,555,405 | 9/1996 | Griesmer et al. | 395/600 |
| 5,560,034 | 9/1996 | Goldstein | 395/800 |
| 5,581,734 | 12/1996 | DiBrino et al. | 395/496 |
| 5,623,449 | 4/1997 | Fischer et al. | 315/200 |

FOREIGN PATENT DOCUMENTS

| | | |
|---|---|---|
| 0403229 | 12/1990 | European Pat. Off. |
| 9700533 | 1/1997 | WIPO |

*Primary Examiner*—Thomas C. Lee
*Assistant Examiner*—Abdelmoniem L Elamin
*Attorney, Agent, or Firm*—Wayne P. Bailey; Duke W. Yee

[57] ABSTRACT

A method and apparatus for efficiently posting entries to a queue within the data processing system. Entries are posted by first processor with the entries being handled by second processor in the data processing system. The interrupt state associated with the queue is checked by the first processor. If the interrupt state is clear, then the entry is posted to the queue. This interrupt state is cleared only when all entries have been cleared from the queue by the second processor. In this manner, an efficient posting of entries to the queue may be accomplished.

34 Claims, 5 Drawing Sheets

5,966,547

SYSTEM FOR FAST POSTING TO SHARED QUEUES IN MULTI-PROCESSOR ENVIRONMENTS UTILIZING INTERRUPT STATE CHECKING

BACKGROUND OF THE INVENTION

1. Technical Field

The present invention relates generally to the processing of data and in particular to a multi-processor data processing system. Still more particularly, the present invention relates to a method and process for posting events or tasks to a shared queue in a multi-processor data processing system.

2. Description of the Related Art

Multi-processor architectures employ shared queues for one processor to post events or tasks to another processor to perform. Queues are data structures used to organize sets of data blocks in memory by means of pointers associated with each data block in the queue. Each queue typically includes a number of elements in which each element is a unit of the queue. Queues are employed to control reusable hardware and software resources of a data processing system, including queues themselves, which are themselves system resources. For example, each element of a queue may represent a different waiting request for an input/output (I/O) device in a data processing system. Queues may be classified into several general types according to the relative locations in the queue. Contiguous queues are queues with elements physically located next to each other while linear chained queues are queues with elements physically disbursed anywhere in main or virtual storage. Hierarchical chained queues are queues that speed up queue operation by using hierarchical searching. Typically, queues may be either singly linked or doubly linked with singly linked queues having pointers that reference the addresses of other elements within the queue. Each element within a singly linked queue contains a pointer to the next element within the queue. In doubly linked queues, each element has a pointer to the next and previous elements in the queue.

These queues allow multiple tasks to be posted asynchronously to the second processor acting on the queue. The posting processor must insure that the queue is not full before posting an additional task to the queue. This condition is usually checked by either reading the current queue entry to make sure that it is empty or computing available entries using multiple queue pointers. In either case, these processes can require significant instructions, especially for embedded processing environments in which resources are more scarce than in main or central processing units. The significant instructions generally translate into increased processing time, slowing the response of the processor determining whether the current queue entry is empty. Therefore, it would be advantageous to have an improvement with an apparatus for reducing the processing overhead for multiple processor or embedded processor architectures in posting events or tasks to a queue.

SUMMARY OF THE INVENTION

The present invention provides for a method and apparatus for efficiently posting entries to a shared queue within the data processing system. Entries are posted by first processor with the entries being read and handled by second processor in the data processing system. The interrupt state associated with the queue is checked by the first processor. If the interrupt state is clear, then the entry is posted to the queue. This interrupt state is cleared only when all entries have been cleared from the queue by the second processor. In this manner, an efficient posting of entries to the queue may be accomplished.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
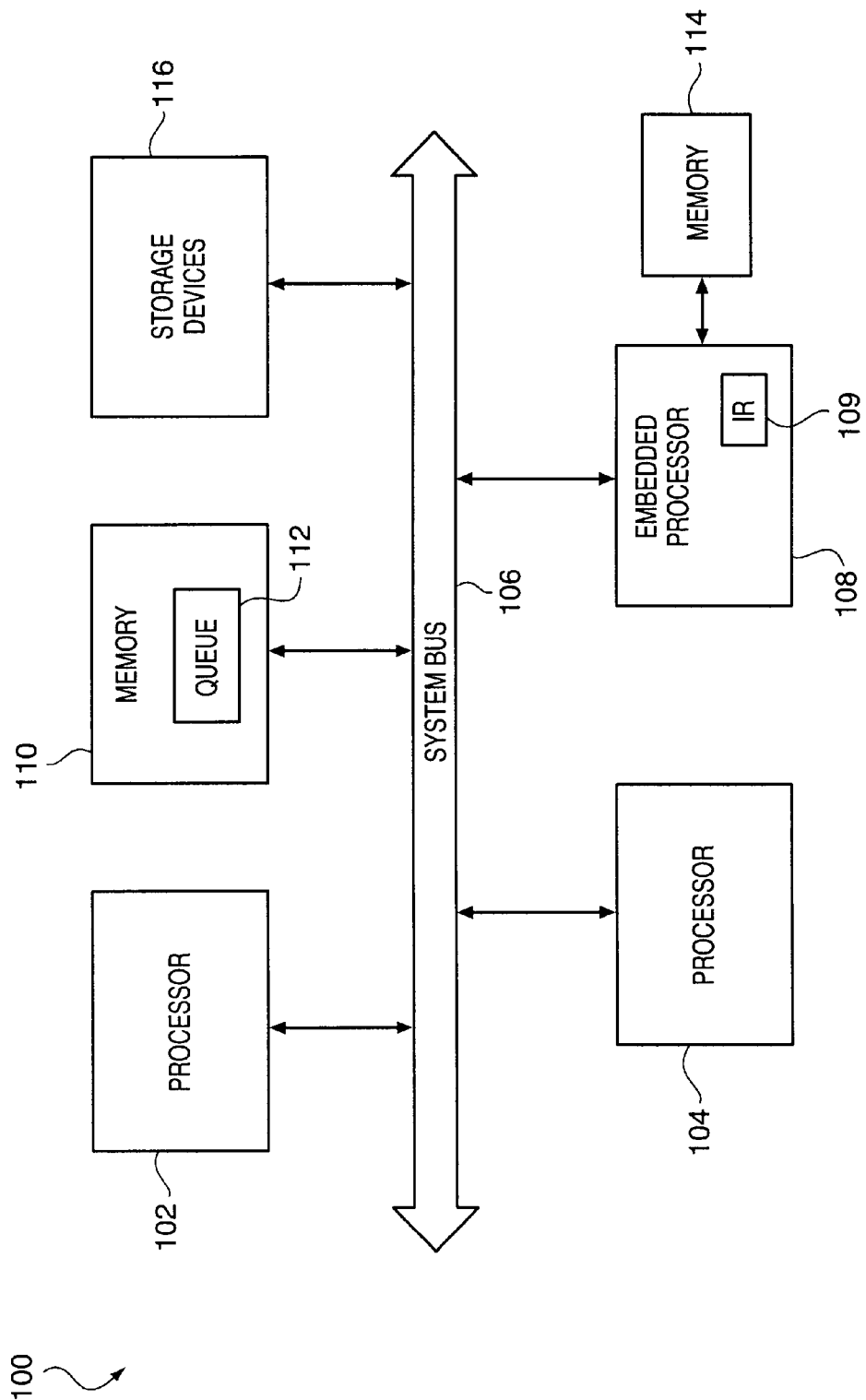
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 includes multiple main processors or central processing units (CPUs): processors 102 and 104, which are connected to system bus 106. System bus 106 may be implemented using various data processing system architectures, such as a peripheral component interconnect (PCI) local bus architecture. Processors 102 and 104 may be implemented using various microprocessors, such as for example, (1) complex instruction set CPUs (CISCs): Intel 80486 and Pentium Processors available from Intel Corporation; $Am5_x86$ Processor from Advanced Micro Devices, Inc.; and Cyrix 6x86 Processor from Cyrix Corporation; and (2) reduced instruction set CPUs (RISCs): DEC Alpha from Digital Equipment Corporation and a PowerPC 604e Processor from Motorola, Inc. Data processing system 100 also includes an embedded processor 108, which is typically found in an adapter, such as a SCSI adaptor. Embedded processor 108 may be located on an adapter providing a connection to a hard drive, in an array of hard drives and/or a CD-ROM. Embedded processor 108 includes an interrupt register (IR) 109. Embedded or special purpose processors are found in network controllers, SCSI controllers, IDE controllers, etc.

Instructions for processes and algorithms executed by processors 102 and 104 may be found in memory 110 which may include both volatile and nonvolatile memory devices, such as random access memory (RAM) and read only memory (ROM). Embedded processor 108 also may execute instructions located in memory 110. Memory 110 is a shared memory that is used to provide communication between processor 102, processor 104, and embedded processor 108. Communication is facilitated through queues found within queue block 112 in memory 110. An output queue, also called a start queue, is used to send requests such as input/output (I/O) requests from processors 102 and 104 to embedded processor 108. Similarly, an input queue, also called a completion queue, is used to return completion information from embedded processor 108 to processors 102 or 104.

Alternatively, embedded processor 108 may execute instructions located in a memory 114 associated with embedded processor 108. Memory 114, like memory 110, may include both volatile and non-volatile memory devices, such as RAM and ROM. Unlike memory 110, memory 114 is not a shared memory in the depicted example. Alternatively, memory 114 could be a shared memory containing queues. The queues manipulated by the various processors in data processing 100 are located in queue block 112 within memory 110.

Storage devices 116 are shared storage devices connected to system bus 106 and represent non-volatile storage in the depicted example. In some instances, such as with SCSI drives or SCSI CD-ROMs, storage devices 116 are connected to bus 106 through an adapter containing an embedded processor. This is a secondary type of storage and may include, for example, hard disks, CD-ROM, and/or tape drives and their equivalents.

Although in the depicted example in FIG. 1, data processing system 100 contains two main processors, processors 102 and 104 and a single embedded processor 108, other numbers of processors, two or more, may be employed in different combinations. For example, the present invention may be implemented in a data processing system containing a single main processor and a single embedded processor. In other words, the present invention may be applied to data processing systems containing at least two processors that communicate through a shared memory.

With reference now to FIGS. 2A–2D, a block diagram of a queue 200 that may be found within queue block 112 in FIG. 1 is depicted according to the present invention. In the depicted example, queue 200 is a circular queue although other types of queues may be implemented according to the present invention. Queue 200 is a list of elements stored in memory within queue block 112. The queue is a "static" queue in the depicted example, defined at initialization with a fixed size. Elements are either active (associated with data, also called an "entry", to be processed) or empty. The queue entries have indicators that denote the context required to process any particular entry. This mechanism is used in the common queue handling algorithm of the present invention.

In the depicted example, queue 200 is a singly linked list in which each element includes two portions: data 202 and pointer 204. Data 202 is an entry in queue 200 and may contain data that is to be used by processor or data in the form of an address (i.e., a pointer) to a block of data. Each pointer 204 points to the next element within queue 200. Pointer 204 in the last element, element N, points back to the first element, element 1 to form a circular queue.

A read pointer 206 is employed to point to the entry in an element currently being read from queue 200 while write pointer 208 points to the element in which data is being written into. Write pointer 208 always leads read pointer 206 with both pointers traversing the entries in a circular fashion.

Figure 2A:
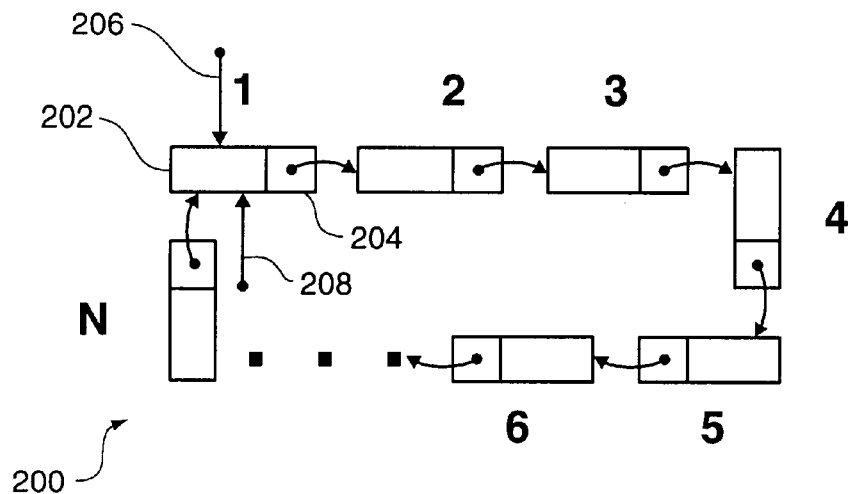
FIGS. 2A–2D depict a block diagram of a queue according to the present invention.
Figure 2B:
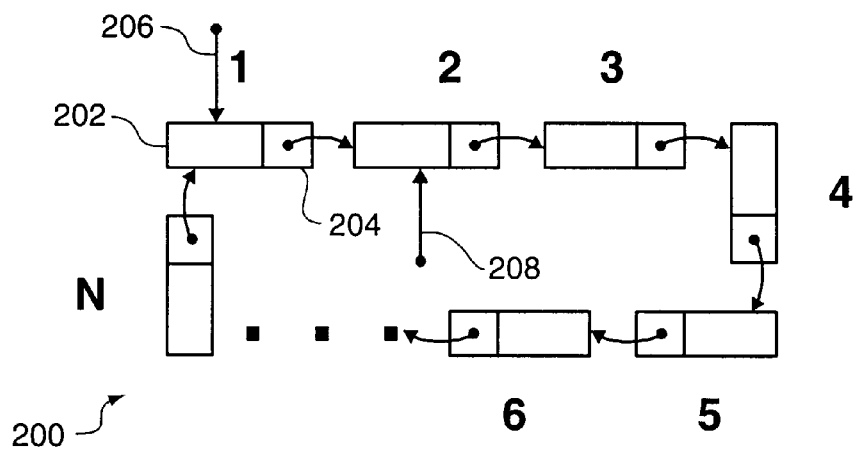
Figure 2C:
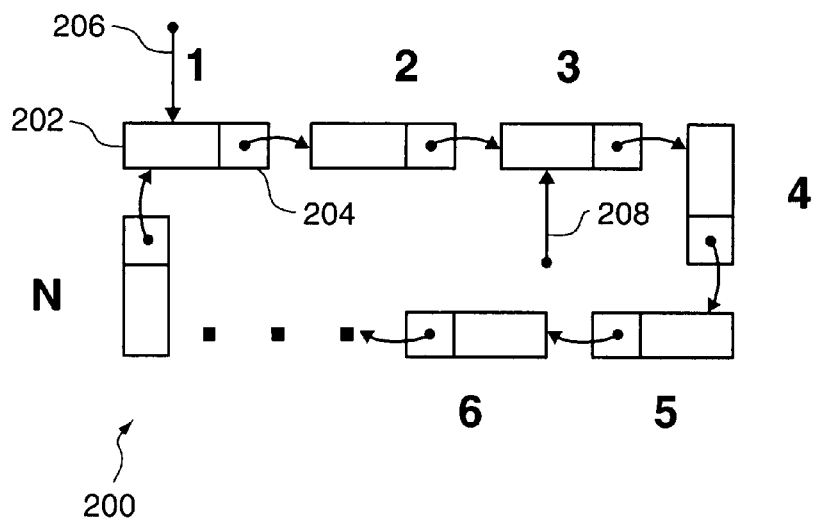
Figure 2D:
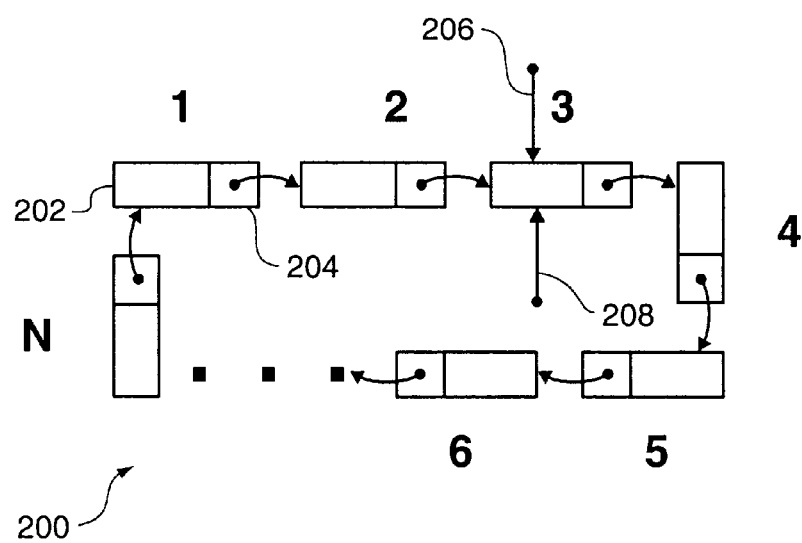

In FIG. 2A, both read pointer 206 and write pointer 208 are pointing to entry 1. All elements are empty in queue 200 in FIG. 2A. In FIG. 2B, after the first entry is posted to an element, and before a read occurs, read pointer 206 still points to element 1 while write pointer 208 now points to element 2 within queue 200. After a second item is posted to queue 200, and before a read occurs, read pointer 206 still points to element 1 while write pointer 208 now points to element 3, as illustrated in FIG. 2C. In such a situation, typically the processor reading entries located in elements with a queue has not yet been notified to read entries from queue 200. In FIG. 2D, both read pointer 206 and write pointer 208 point to element 3 in queue 200. In this situation, two entries have been posted (written to) the queue and both entries have been read from the queue.

According to the present invention, the multiprocessor architecture depicted in FIG. 1 employs a shared queue in queue block 112 to post events or tasks for another processor to handle. For example, processor 108 may post task in the shared queue in queue block 112 for either processor 102 or processor 104 to execute. In the architecture, the queue in queue block 112 has multiple entries with at least two. Additionally, the processor posting tasks, such as embedded processor 108, uses a software or hardware interrupt to signal the second processor, processor 102 or 104, that embedded processor 108 has placed one or more tasks into the queue that are ready for processor 102 or 104 to handle. In embedded processor 108, interrupt register 109 is used to signal the second processor. The various processors within data processing system 100 are running asynchronously to each other, meaning that each of the processors is processing concurrently (overlapped operation) and no control or communication exists between the two except for the shared queues with queue block 112. The context of the shared queue/interrupt applies only to two processors at any one time, but in an environment of more than two processors, such as in data processing system 100, the assignment of which two processors control the context may be performed dynamically as in an symmetric multiprocessor platform (SMP) environment.

The processor posting tasks or events to the queue is called the "posting" processor while the processor handling the tasks is referred to as the "host" processor. In posting tasks or events to queues within queue section 112, the posting processor must ensure that a queue element is available (empty) before posting an entry (i.e., a task or event) to the queue element. This is usually performed by posting processor reading the element and checking that it is empty or by calculating the number of elements used via queue pointers. Using queue pointers for calculations, however, is difficult because of the asynchronous relationship of the processors and the need for synchronization/locking mechanisms.

Reading the queue element requires memory access and a test that the element is empty. In many cases, queue entries stored in the queue elements are system memory addresses which can be 32, 64, or more bytes long. Testing for an empty element can require multiple tests of bytes or words, requiring many processor instructions. After handling a task or event from a queue within queue block 112, the host processor is required to mark the element as empty after it completes the handling of that entry.

According to the present invention, the interrupt which is used to signal the host processor that tasks have been placed into the queue within queue block 112 is also used as a "fast post" flag. For the interrupt to be used, it is set by posting processor when one or more entries are posted to elements in the shared queue. Additionally, the "host processor" must not clear the interrupt until it has cleared all the entries from elements in the queue. By using this interrupt state in this manner, the posting processor can first check the interrupt state and if cleared, can immediately post an entry to the queue without any additional checks for an empty element. If the interrupt state is set, then the posting processor performs the additional check for an empty element.

The savings in processor time using the processes of the present invention may occur when posting processor is posting the first entry into the queue after the host processor has handled all of the queued entries and cleared the interrupt. One environment in which this occurs is when both the posting processor and the host processor are not very busy, but no overall system gain is seen due to the low system utilization.

This benefit is also gained when the host processor can handle tasks posted on the queue as fast or faster than posting processor can post them. Only one entry is posted on the queue by posting processor before the host processor responds to the interrupt, handles the task, and clears the interrupt. An example of this case is the use of the posting processor to post tasks to queues within queue block 112, such as embedded processor 108, and the host processor being a very fast system processor, such as processor 102 or 104 in the depicted example. The interrupt is located in interrupt register 109 within embedded processor 108 in FIG. 1.

Although the depicted example describes embedded processor 108 as the processor posting entries to queues within queue block 112, entries also may be posted to queues within queue block 112 by processor 104 for processor 102 to handle as the host processor. Additionally, the process may be employed for entries posted from processors 102 or 104 for processing by embedded processor 108. Although the interrupt register is illustrated as being within embedded processor 108, interrupt register 109 can be located in other portions of data processing system 100. For example, interrupt register 109 can be implemented within a block of memory 110. Additionally, although three processors are depicted in the illustrated embodiment, other numbers of processors from two on up may be employed using the processes of the present invention.

Figure 3:
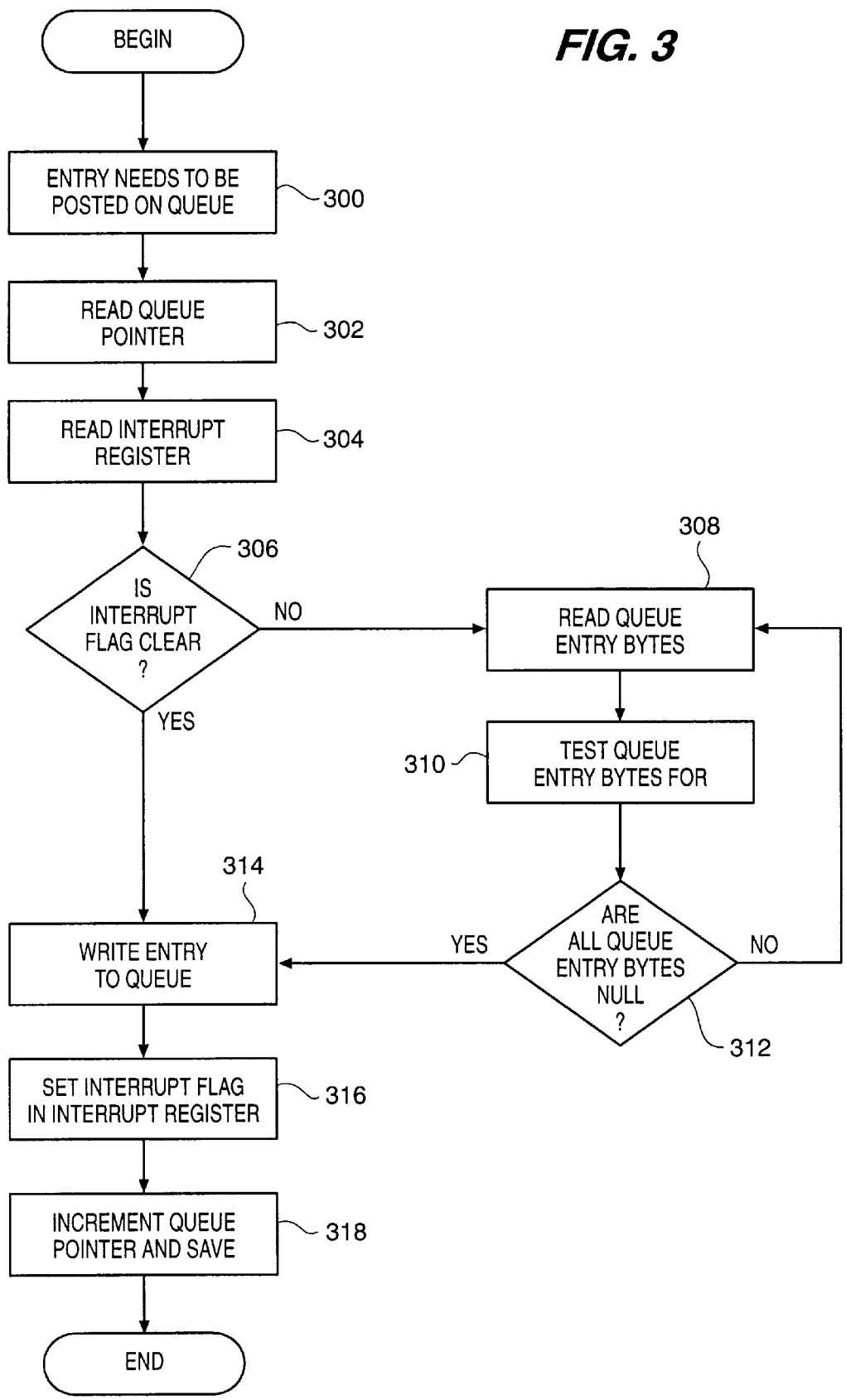
FIG. 3 is a flowchart of a process for a posting processor posting events or tasks to a host processor according to the present invention.

With reference now to FIG. 3, a flowchart of a process for a posting processor posting events or tasks to a host processor depicted according to the present invention. In the depicted example, the events or tasks are posted to a static queue. The process begins by the processor receiving an entry that needs to be posted on the queue (step 300). Thereafter, the queue pointer is read (step 302). Then, the interrupt register is read (step 304) with a determination as to whether an indicator in the form of an interrupt flag in the interrupt register is clear (step 306). If the interrupt flag is not clear, the process then reads the queue entry bytes (step 308), and tests the queue entry bytes to determine whether the bytes are null (step 310). If the queue is full, the process loops back through step 308 until at least one queue element becomes empty. Due to the structure of the queue and the way the queue pointers work, if the queue is full and the posting process must wait for an empty element, the queue pointer read in steps 302 will always be pointing to the next element that the host process will mark as empty.

No need for the posting process to search the queue for an empty element is present. Basically, queue entries stored in queue elements consist of multiple bytes. The embedded processor can check only one byte at a time in the depicted example. As a result, in the depicted embodiment, four bytes are present in an entry, resulting in four reads and four tests being required.

A determination is then made as to whether all the queue entry bytes are null (step 312). If all the queue entry bytes are not null, the process loops back to step 308. Otherwise, the queue entry is written to the empty element in the queue (step 314). The process also proceeds directly to step 314 from step 306 if the interrupt flag is clear. Next, the process sets the interrupt flag in the interrupt register (step 316), and then increments the queue pointer and saves the queue pointer (step 318). Thereafter, the process terminates.

Figure 4:
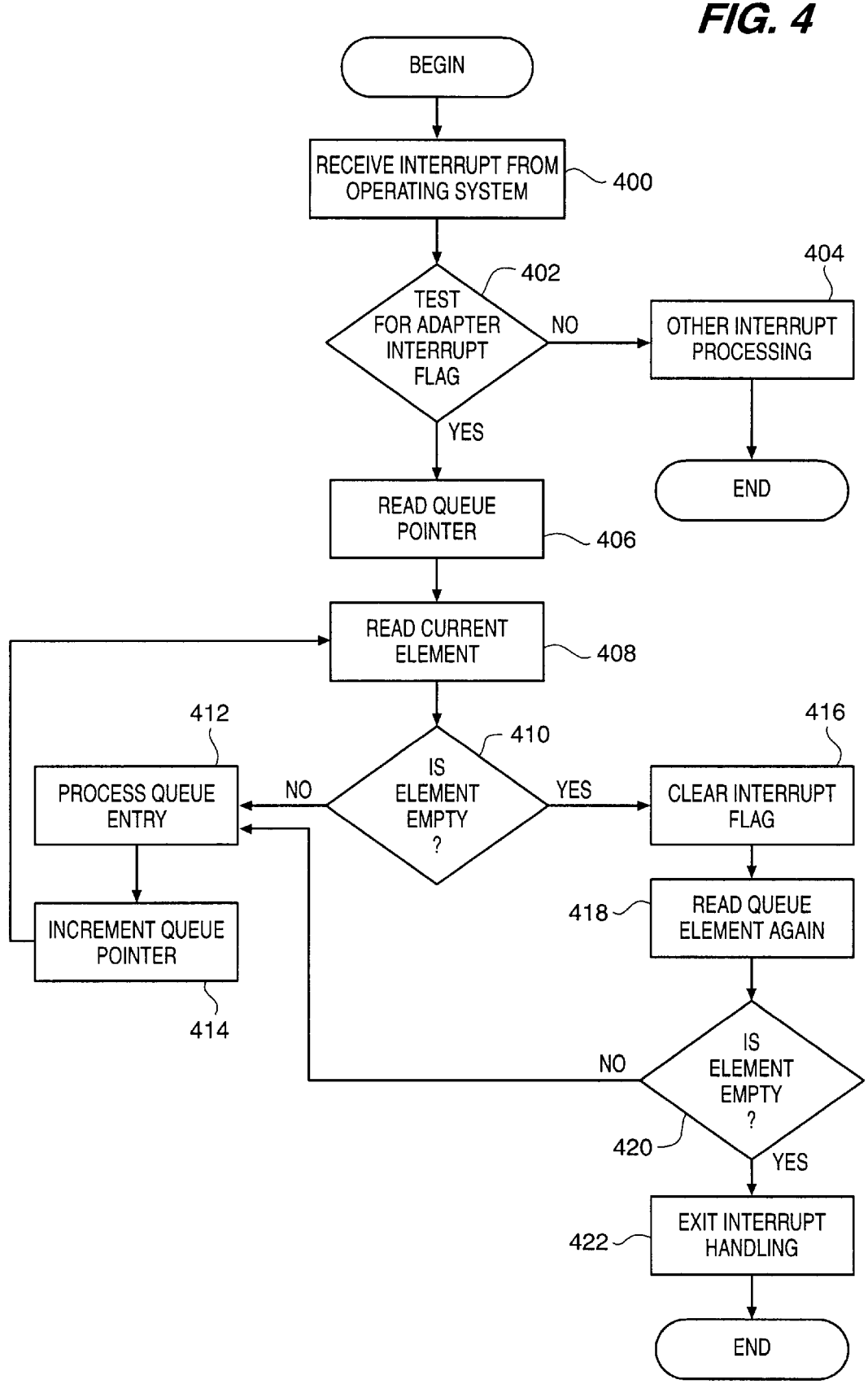
FIG. 4 depicts a flowchart of a process followed by host processor according to the present invention.

With reference now to FIG. 4, a flowchart of a process followed by a host processor is depicted according to the present invention. The process begins by receiving an interrupt from the operating system (step 400). Thereafter, the interrupt is tested to determine whether the interrupt is an adapter interrupt flag (step 402). If the interrupt is not for the adapter interrupt flag, the process then proceeds with other interrupt processing (step 404) with the process terminating thereafter. If the interrupt is for the adapter interrupt flag, the process then reads the queue pointers (step 406). Then, the current queue element is read (step 408). Next, a determination is made as to whether the current queue element is empty (step 410). If the current queue element is not empty (an entry is present), the process then processes the entry in the queue element (step 412), and it then increments the queue pointers (step 414) with the process then returning to step 408.

With reference again to step 410, if the current queue element is empty, the process then clears the interrupt flag (step 416) and then reads the queue element again (step 418). In step 418, the empty element is read again after clearing the interrupt flag in case the embedded processor posted an entry to the element just before the flag was cleared. In the depicted example, the interrupt flag could be set again by the embedded processor posting additional entries. But if such an event does not occur, it is valid to clear the interrupt multiple times. A determination is then made as to whether the queue element is still empty (step 420). If the queue element is not empty, the process proceeds to step 412 as previously described. Step 420 is performed in the depicted example to insure that the element remains empty while the interrupt flag is cleared. If the queue element is empty, the process then exits interrupt handling (step 422) and terminates thereafter.

Thus, the present invention provides an improved method and apparatus for posting entries to a queue. The present invention provides this advantage by the use of the state of an interrupt line or register as a "fast post" flag, as well as a signalling device for shared queues in multiprocessor environments. Through the use of this "fast post" flag, significant processor overhead is avoided in certain multiprocessor environments. The present invention provides advantages to embedded processor systems in which resources are limited compared to those of main processor or central processor units. The present invention allows an embedded processor controlling a subsystem to communicate with a very high speed system processor. For the majority of the time, the present invention can be used by the embedded processor resulting in a higher subsystem performance and throughput.

It is important to note that while the present invention has been described in the context of a fully functional data processing system, those skilled in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include: recordable type media such as floppy disks and CD-ROMs and transmission type media such as digital and analog communications links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for posting entries to a queue in a data processing system, wherein entries are posted by first processor and handled by second processor, the method comprising:
   checking an interrupt state associated with the queue, wherein the interrupt state being set indicates a posting of an entry to the queue; and
   posting an entry to the queue in response to a determination that the interrupt state is clear, wherein the interrupt state is cleared in response to all entries being cleared from the queue, providing for an efficient posting of entries to the queue.

2. The method of claim 1 further comprising storing the interrupt state in an interrupt register in the first processor.

3. The method of claim 1 further comprising storing the interrupt state in a memory.

4. The method of claim 1 further comprising checking an entry within the queue to determine whether the entry is empty in response to an absence of the interrupt state being clear.

5. The method of claim 1, wherein the first processor is an embedded processor.

6. The method of claim 1, wherein the second processor is an embedded processor.

7. A data processing system comprising:
   a first processor, wherein the first processor posts entries to a queue;
   a second processor, wherein the second processor handles entries posted to the queue by the first processor;
   checking means, responsive to a presence of an entry for checking an interrupt state associated with the queue, wherein the interrupt state being set indicates a posting of an entry to the queue; and
   writing means, responsive to a determination that the interrupt state is clear, for writing the entry to the queue, wherein the interrupt state is cleared when entries have been cleared from the queue.

8. The data processing system of claim 7 further comprising determination means, responsive to a determination of an absence of a clear interrupt state, for determining whether a portion of the queue is empty; and
   writing means for writing an entry to the queue.

9. The data processing system of claim 7, wherein the interrupt state is stored in an interrupt register in the first processor.

10. The data processing system of claim 7, wherein the interrupt state is stored in a memory.

11. The data processing system of claim 7, wherein the posting means and the checking means are executed by the first processor.

12. The method of claim 7, wherein the first processor is an embedded processor.

13. The method of claim 7, wherein the second processor is an embedded processor.

14. A data processing system comprising:
   a memory;
   a queue located in the memory, the queue having a plurality of elements for storing entries;
   an interrupt state associated with the queue, wherein the interrupt state being set indicates a posting of an entry to the queue;
   a first processor, the first processor for reading entries in the queue, wherein the first processor clears the interrupt state in response to reading all entries within the queue;
   a second processor, the second processor having a plurality of modes of operation including:
      a first mode of operation, responsive to an entry being present for the queue, in which the interrupt state associated with the queue is checked; and
      a second mode of operation, responsive to a determination that the interrupt state is clear, in which an entry is posted to the queue.

15. The data processing system of claim 14 wherein the second processor includes:
   a third mode of operation, responsive to an absence of a clear interrupt state, in which a determination is made as to whether an element within the plurality of elements is empty; and
   a fourth mode of operation, responsive to a determination that the element is empty, in which the entry is written to the element.

16. The data processing system of claim 14, wherein the interrupt state is stored in an interrupt register within the second processor.

17. The data processing of claim 14, wherein the interrupt state is stored in a memory.

18. The method of claim 14, wherein the first processor is an embedded processor.

19. The method of claim 14, wherein the second processor is an embedded processor.

20. Computer program product comprising a computer readable media having computer readable instructions embodied therein for posting entries to a queue, wherein the computer readable instructions include:
   first instructions for checking an interrupt state associated with the queue, wherein the interrupt state indicates a posting of an entry to the queue; and
   second instructions for posting an entry to the queue in response to a determination that the interrupt state is clear, wherein the interrupt state is cleared when all entries have been cleared from the queue.

21. The computer readable media of claim 20, wherein the computer readable media is a floppy disk.

22. The computer readable media of claim 20, wherein the computer readable media is a CD-ROM.

23. The computer readable media of claim 20, wherein the computer readable media is a hard disk drive.

24. The method of claim 1 further comprising:
   checking an entry within the queue to determine whether the entry is empty in response to an absence of the interrupt state being clear;
   checking an entry within the queue to determine whether the entry is empty in response to a determination that an entry was not empty; and
   posting an entry to the queue in response to a determination that an entry is empty.

25. The method of claim 1 further comprising:
   checking an entry within the queue to determine whether the entry is empty in response to a determination that an entry was not empty; and
   posting an entry to the queue in response to a determination that an entry is empty.

26. The method of claim 1 further comprising:
   clearing the interrupt state;
   checking an entry within the queue to determine whether the entry is empty; and
   handling an entry to the queue in response to a determination that an entry is not empty.

27. The data processing system of claim 7 further comprising:

determination means, responsive to a determination of an absence of a clear interrupt state, for determining whether a portion of the queue is empty;

determination means, responsive to a determination of a portion of the queue being not empty, for determining whether a portion of the queue has been emptied; and writing means, responsive to a determination that a portion of the queue has been emptied, for writing an entry to the queue.

28. The data processing system of claim 7 further comprising:

determination means, responsive to a determination of a portion of the queue being not empty, for determining whether a portion of the queue has been emptied; and writing means, responsive to a determination that a portion of the queue has been emptied, for writing an entry to the queue.

29. The method of claim 7 further comprising:

clearing means for clearing the interrupt state;

determining means for determining whether a portion of the queue is empty; and handling means for handling an entry to the queue in response to a determination that a portion of an entry is not empty.

30. The data processing system of claim 14 wherein the second processor further comprises:

a third mode of operation, responsive to an absence of a clear interrupt state, in which a determination is made as to a portion of the queue is empty; and a fourth mode of operation, responsive to a determination of a portion of the queue being not empty, in which a determination is made as to whether a portion of the queue has been emptied; and a fifth mode of operation, responsive to a determination that a portion of the queue has been emptied, in which an entry is posted to the queue.

31. The data processing system of claim 14 wherein the second processor further comprises:

a third mode of operation, responsive to a determination of a portion of the queue being not empty, in which a determination is made as to whether a portion of the queue has been emptied; and a fourth mode of operation, responsive to a determination that a portion of the queue has been emptied, in which an entry is posted to the queue.

32. The data processing system of claim 14 wherein the first processor further comprises a mode of operation in which an entry is ready from the queue in response to a determination that a portion of an entry is not empty.

33. The computer readable media of claim 20 further comprising:

third instructions, responsive to a determination of an absence of a clear interrupt state, for determining whether a portion of the queue is empty;

fourth instructions, responsive to a determination of a portion of the queue being not empty, for determining whether a portion of the queue has been emptied; and fifth instructions, responsive to a determination that a portion of the queue has been emptied, for posting an entry to the queue.

34. The computer readable media of claim 20 further comprising:

third instructions, responsive to a determination of a portion of the queue being not empty, for determining whether a portion of the queue has been emptied; and fourth instructions, responsive to a determination that a portion of the queue has been emptied, for posting an entry to the queue.

* * * * *